No. 12,381.

REISSUED AUG. 15, 1905.

G. GIBBS.

RAILWAY PASSENGER CAR.

APPLICATION FILED MAY 29, 1905.

4 SHEETS—SHEET 1.

Witnesses:
G. A. Pennington
R. F. Funk

Inventor:
George Gibbs,
by Bakewell & Cornwall
Attys.

No. 12,381.

REISSUED AUG. 15, 1905.

G. GIBBS.

RAILWAY PASSENGER CAR.

APPLICATION FILED MAY 29, 1905.

4 SHEETS—SHEET 2.

Witnesses:
G. A. Pennington
B. F. Funk

Inventor:
George Gibbs,
by Bakewell & Cornwall
Attys.

No. 12,381.
REISSUED AUG. 15, 1905.
G. GIBBS.
RAILWAY PASSENGER CAR.
APPLICATION FILED MAY 29, 1905.
4 SHEETS—SHEET 3.
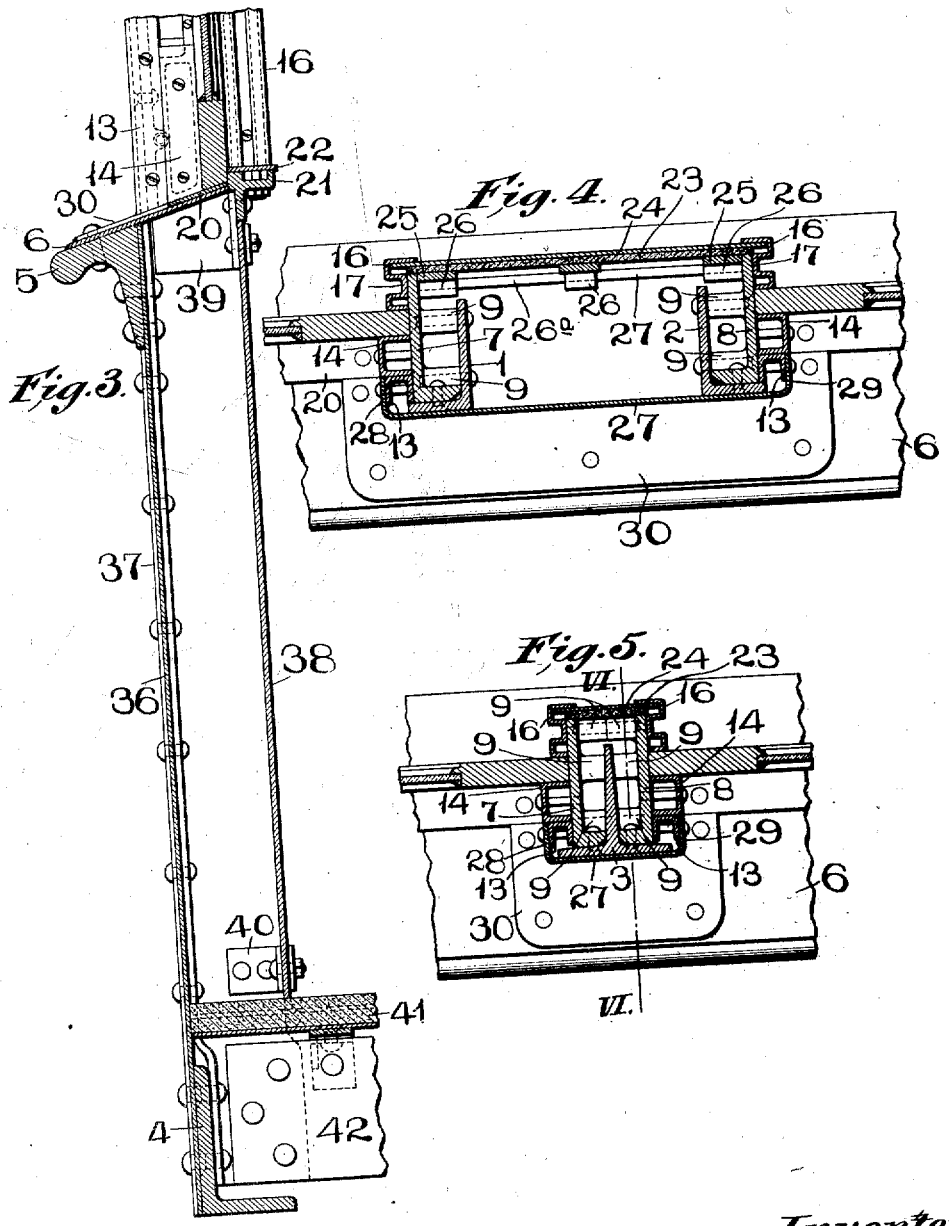
Witnesses:
G. A. Pennington
B. F. Funk
Inventor:
George Gibbs,
by Bakewell & Cornwall
Attys.

No. 12,381.

REISSUED AUG. 15, 1905

G. GIBBS.

RAILWAY PASSENGER CAR.

APPLICATION FILED MAY 29, 1905.

4 SHEETS—SHEET 4.

Witnesses:
G. A. Pennington
R. F. Funk

Inventor
George Gibbs,
by Bakewell Cornwall
Atty.

UNITED STATES PATENT OFFICE.

GEORGE GIBBS, OF NEW YORK, N. Y.

RAILWAY PASSENGER-CAR.

No. 12,381. Specification of Reissued Letters Patent. Reissued Aug. 15, 1905.

Original No. 777,624, dated December 13, 1904. Application for reissue filed May 29, 1905. Serial No. 262,938.

*To all whom it may concern:*

Be it known that I, GEORGE GIBBS, a citizen of the United States, residing in the city, county, and State of New York, have invented a certain new and useful Improvement in Railway Passenger-Cars, of which the following is a full, clear, and exact description, such as will enable others skilled in the art to which it appertains to make and use the same, reference being had to the accompanying drawings, forming part of this specification, in which—

Figure 1:
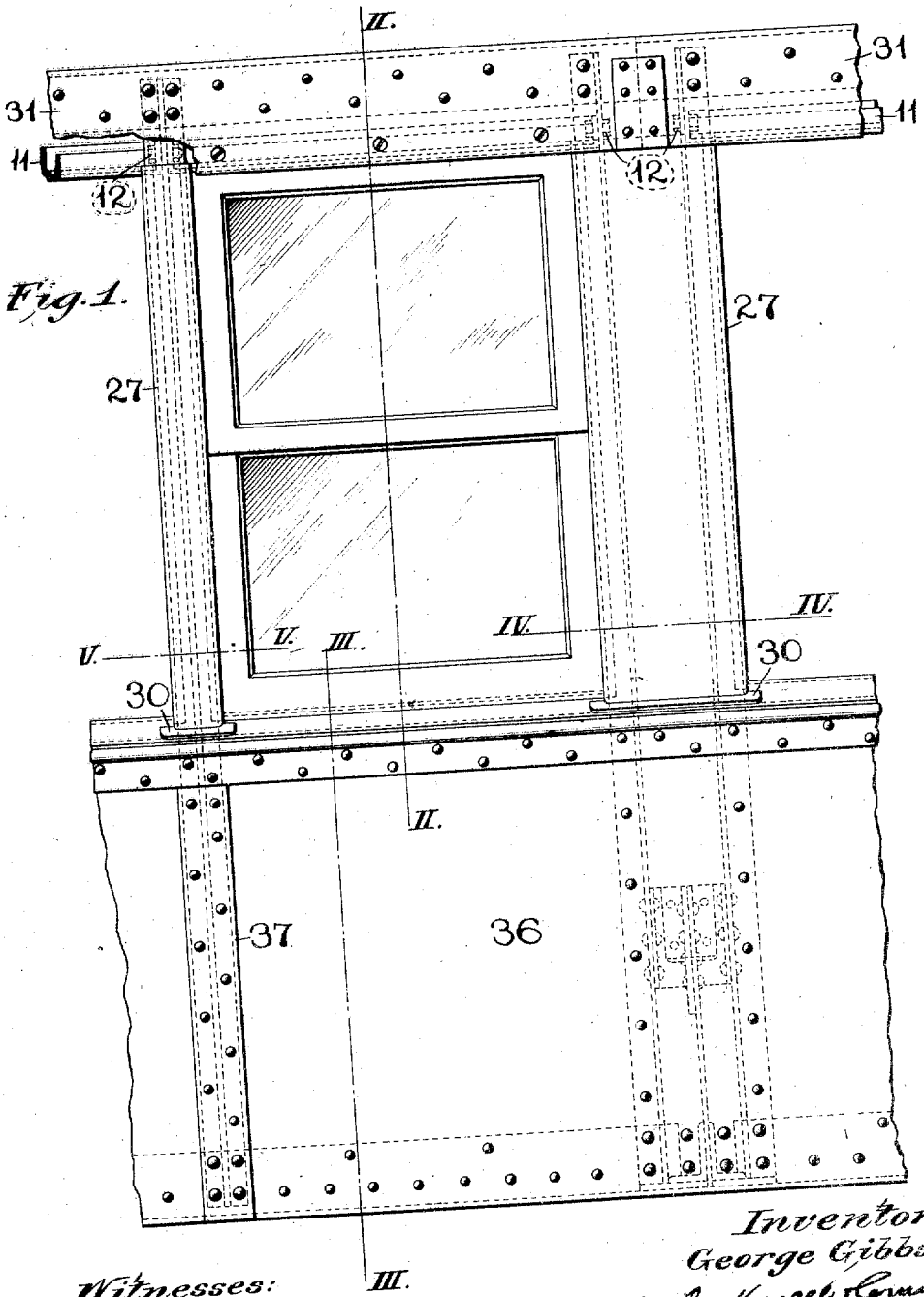
Figures 2, 6:
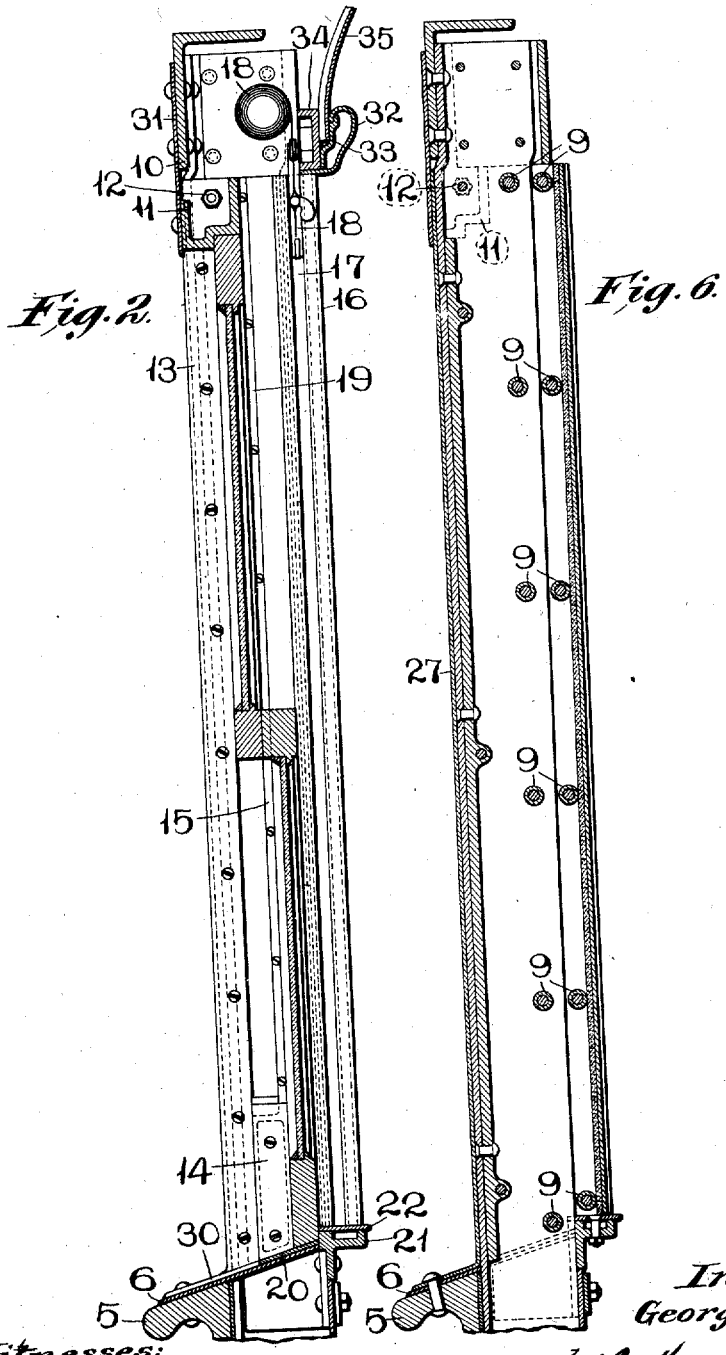
Figure 7:
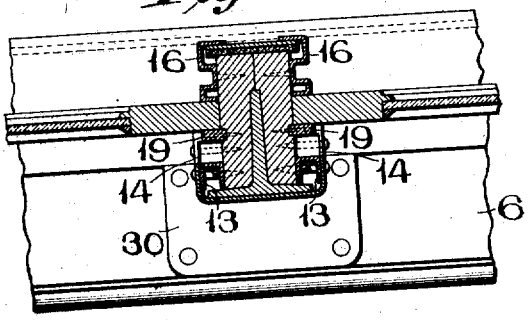
Figure 8:
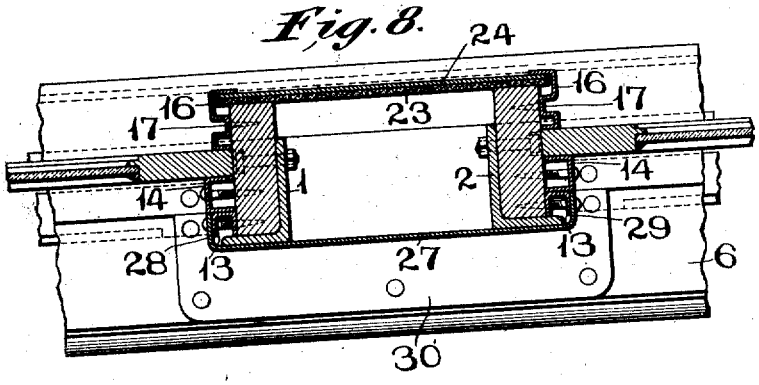

Figure 1 shows a part of the side wall of the car. Figs. 2 and 3 are vertical sectional views on the lines 2 2 and 3 3, respectively, of Fig. 1. Figs. 4 and 5 are sectional views on the lines 4 4 and 5 5, respectively, of Fig. 1. Fig. 6 is a sectional view on the line 6 6 of Fig. 5; and Figs. 7 and 8 are sections similar to those shown in Figs. 4 and 5, but showing the wood fillers.

This invention relates to railway passenger-cars, and more particularly to the construction of the side posts and window-frames.

One of the objects is to provide a window-frame construction in combination with the side posts which will be strong, light in weight, sightly in appearance, and inexpensive in manufacture.

The structure may be made entirely of metal or combined with non-inflammable materials. However, wood may be substituted for certain parts, if desired.

The side posts or supports for the roof are preferably in the form of angles or T's. The former will usually be used in the wide posts, as 1 2, Fig. 4, and the T-irons in the narrow posts, as 3, Fig. 5. These members in the preferred construction extend unbroken from the lower member 4 of the side truss to the roof. The lower member of the side truss is illustrated as an angle having its horizontal flange extending inwardly. The belt-rail below the windows is formed by the upper member 5 of the side truss, and on the belt-rail is fastened a plate 6, constituting the outer window-sill. This plate may consist of a single piece as long as the car, with sections cut out from the inner edge, so that it will fit the posts and extend inwardly under the lower sashes. I prefer, however, to make the sill-plate in shorter sections for one, two, or more windows.

The top flange of the belt-rail 5, which constitutes the compression member for the plate-girder side, is inclined in an outward and downward direction. The flanges on the post or post-irons are oppositely disposed, as shown in Figs. 4, 5, 6, and 7, and fitted in the angles thereof are fillers 7 and 8, preferably castings. The flanges of the angles are turned inwardly and they may be provided with suitable studs or lugs, as 9, which may be cored out to receive rivets or bolts by which the fillers are secured. The studs bear against the post members, as illustrated in Fig. 4, and the registering studs on the opposite filler, as illustrated in Fig. 5. The fillers extend upwardly from the sill or belt-rail to about the level of the roof-beam 10, their flanges being somewhat shorter, as shown in Figs. 1 and 6, to receive the top of the frame. The latter part is shown at 11, Fig. 6, its position being shown in dotted lines, and is preferably a box-like casting rabbeted on its inner edge to receive the upper sash. It may be secured to the post members by bolts or rivets 12.

Outer stops or guides are provided for the upper sash and are shown as being formed by channel-bars 13, removably secured to the filler by screws or other suitable means and extending to the upper frame-piece 11. Adjacent to the stops 13 are box-like castings 14, extending a short distance above the sill and constituting abutments on which the upper sash rests in its lowered position. The inner stops for the lower sash (shown at 16) are secured to the fillers by means permitting their removal. They consist, preferably, of pressed steel, so as to exert a spring-pressure on the sash, and each stop is formed with a groove 17, so that guides are provided for the curtain 18. Between the sashes narrow metal strips 19 may be provided and fastened to the fillers by screws, rivets, bolts, or other suitable means. If desired, a narrow plate 20 may be provided on the sills 6 for the lower sash and upon which the abutments 14 may rest.

The inside sill is illustrated as being a flanged piece 21, preferably a casting, and which may be hollowed, as shown in Figs. 2 and 3, to lessen its weight. It carries a finishing strip or plate 22, secured thereto in any convenient manner. The space between the fillers 7 and 8 is closed on the inside of the car by a sheet 23 of any suitable material, which is preferably sound-deadening and non-inflammable. A good material for this purpose is a composition known as "transite." On the sheet 23 is a sheathing of metal 24, which may be of an ornamental character, if desired. The two are secured to the posts in any convenient way—as, for example, by the flanges on the inner stops 16, as shown. In the narrow posts no support other than the fillers is needed for the sheathings 23 and 24; but in the wide posts supports may be provided in the center thereof and also at the edges, if desired. These may consist of vertical strips 25, having projections or lugs 26, through which extend carrying-rods 26[a], suitably secured to the fillers 7 and 8.

The outside of the post is closed by a casing 27, having flanges 28 and 29, which cover the stops 13 and prevent the entrance of water into the interior of the post. The flanges may be secured to the stops 13 by the same bolts or rivets that fasten the latter to the fillers, as shown. At its lower end the casing is provided with an outstanding flange 30, fitting the belt-rail closely and preventing water from penetrating below the sill between the post and the contiguous edges of the former. At its upper end the casing is covered by the longitudinal sheathing 31. While the window-stops are shown in the drawings as being arranged for lowering the upper sash, it is to be understood that if the upper sash is to be stationary and the lower sash raised the arrangement of the stops could be modified.

The finish above the windows on the inside consists of a metal molding 32, engaging a flange or bead on a clamping-strip 33, between which latter and the channel-iron 34 the inner roof-sheathing 35 is held.

Instead of using metallic fillers, as above described, I may employ wooden pieces, as shown in Figs. 7 and 8, the construction otherwise being the same as that shown in the preceding figures. It will be noted that the plane on which the section shown in Fig. 7 is taken is a little above the abutment 14, Figs. 2 and 3, and hence shows the top of the latter part instead of a section thereof. The wood pieces used as filling members may be treated to render them non-inflammable, if desired.

The side-wall construction below the windows is shown in Figs. 1 and 3. 36 is the plate-girder of the side truss forming the outer sheathing. It is preferably made in sections and is riveted to the flanged post members. The joints between sections are covered by vertical plates, one of which is shown at 37. The inner sheathing is indicated at 38, carried by the roof-posts in any convenient manner, as by means of angle-pieces 39 and 40. The floor 41 is supported by the cross-trusses of the car-frame, one of which is shown at 42.

It will now be seen that a side-post window-frame structure built according to my invention is strong and light and may easily be made as ornamental in appearance as desired, the materials used lending themselves readily to that purpose. At the same time the construction is not only simple and inexpensive, but is sound-deadening and a poor conductor of heat on account of the air-spaces around the posts (or the wood fillers where they are used) and the use of the composition sheathing under the metal finish. Its poor conductivity of heat and sound I consider one of the most valuable characteristics of my invention, since protection against extraneous sounds and conduction of heat through the walls in steel passenger-car construction is of the utmost importance.

Numerous variations from the form herein specifically described are permitted within the spirit of the invention, and I therefore do not consider myself limited to the precise form shown.

Having thus described the invention, what is claimed as new, and desired to be secured by Letters Patent, is—

1. In a window construction for railway-cars, the combination of a metal post, metallic filling members on opposite sides of the post and spaced therefrom, stops for the window-sashes carried by the filling members, and a sheathing for the interior finish of the car carried by and covering the space between the filling members; substantially as described.

2. In a window construction for railway-cars, the combination of a metal post, metallic filling members on opposite sides of the post and having studs for spacing the two apart, stops for the window-sashes carried by the filling members, and a sheathing carried by and covering the space between the filling members, substantially as described.

3. In a window construction for railway-cars, the combination with a metal post member for supporting the roof, of a metal filling member spaced apart from the post members, a channel-bar secured to the filling member, constituting a sash-stop, and a metal sash-stop having a groove for the window-curtain; substantially as described.

4. In a window construction for railway-cars, the combination with a metal post member, a metal filling member secured to the post member, the two being spaced apart, of a channel-bar forming a sash-stop, an abutment for the upper sash, and a stop consisting of a shaped strip having a groove for the window-curtain, the stops and abutment being secured to the filling member; substantially as described.

5. In a window-frame and side-post construction for railway-cars, the combination with posts consisting of metal standards, of filling members secured to the standards, stops for the window-sashes carried by the filling members, and a top member for the window-frame, extending between the posts; substantially as described.

6. In a window-frame and side-post construction for railway-cars, the combination with posts consisting of metal standards, of filling members secured to the standards, stops for the sashes secured to the filling members, and a channeled top member for the frame extending between the posts; substantially as described.

7. In a railway-car, the combination of side posts consisting of metal standards, filling members secured to the standards, carrying stops for the window-sashes, a top member for the window-frame extending between the posts, a belt-rail below the window-openings, and a metal plate on the belt-rail extending into the window-openings to form the window-sill; substantially as described.

8. In a window construction for railway-cars, an inner sill consisting of a flanged member secured to the wall of the car, and a metal finishing-plate on the outstanding flange of the sill member; substantially as described.

9. In a railway-car, the combination with the belt-rail below the windows, and a side post inside the belt-rail, of a sill-plate on the belt-rail, and a casing for the post above the belt-rail having a flange at its base resting on the sill-plate; substantially as described.

10. In a railway-car, the combination with a side post, of an outer covering therefor consisting of a metal casing having inwardly-turned flanges at its sides, and an outwardly-extending flange around its lower end; substantially as described.

11. In a railway-car, the combination with a side post, and a window-sill around the outside of the post, of a sheathing for the outside of the post, consisting of a metal casing, having an outstanding circumferential flange resting on the sill; substantially as described.

12. In a railway-car, a side-post covering consisting of a metal casing having an outstanding circumferential flange; substantially as described.

13. In a railway-car, the combination with a side post, of a sound-deadening and heat-insulating sheathing, and metal strips on the sides of the posts having flanges engaging the sheathing and securing the same in position; substantially as described.

14. In a railway-car, the combination with a side post, of a sound-deadening and heat-insulating sheathing, and means for securing the sheathing to the post, consisting of sash-stops on the sides of the posts having flanges engaging the sheathing; substantially as described.

15. In a side-post construction for railway-cars, in combination, a metal side post, an inner sheathing, sash-stops on the sides of the posts having flanges engaging the sheathing, and an outer casing for the post having vertical and horizontal flanges for protection against weather; substantially as described.

16. In a side-post construction for railway-cars, in combination, a side post, an inner sheathing therefor, consisting of a sheet of sound-deadening and heat-insulating material and a finishing sheet of metal, and sash-stops on the sides of the posts having means for engaging the sheathing to secure the same in position; substantially as described.

17. In a side-post construction for railway-cars, the combination of spaced metal standards, a sheathing covering the space between the standards, and sash-stops having means for engaging the sheathing to hold the same in position; substantially as described.

18. In a side-post construction for railway-cars, the combination of spaced metal standards, a sheathing covering the space between the standards, and supports for the sheathing intermediate the standards; substantially as described.

19. In a railway-car, the combination of a metal post, metallic filling members on opposite sides of the post and spaced therefrom, window-sash stops carried by the filling members, and a casing for the post having flanges which cover the stops and prevent the entrance of water into the interior of the post; substantially as described.

20. In a railway-car, the combination of a metal post, metallic filling members on opposite sides of the post and spaced therefrom, window-sash stops carried by the filling members, and a casing for the post having flanges which cover the stops and prevent the entrance of water into the interior of the post, and an outstanding flange at the lower end of the casing to prevent water from penetrating below the post; substantially as described.

21. In a railway passenger-car, the combination with the verticals of a car side, of flanged members secured to said verticals and having outstanding flanges adjacent to the window-sills; substantially as described.

22. In a railway passenger-car, the combination with the verticals of a car side, of a covering for said verticals consisting of a vertically-flanged member having an outstanding flange at one end thereof; substantially as described.

23. In a railway passenger-car, the combination with a side post and a window-sill around the outside of the post, of a sheathing for the outside of the post consisting of a vertically-flanged member having an outstanding flange resting on the sill; substantially as described.

24. In a railway passenger-car, a side-post covering consisting of a vertically-flanged member having an outstanding flange at right angles to the vertically-flanged portion; substantially as described.

25. In a railway passenger-car, a side-post covering consisting of a metal casing having an outstanding flange; substantially as described.

26. In a railway-car, the combination with a plate-girder side, of posts arranged along the sides and spaced apart, a sheathing covering the inner space formed by the posts, and a casing for the outer side of the post having flanges overlapping the edges of the posts to prevent the entrance of moisture into the interior of the post; substantially as described.

27. In a railway-car, the combination with a side post comprising spaced angles, of an outer covering therefor consisting of a metal casing having inturned flanges at its side, and an inner sheathing covering said post; substantially as described.

28. In a car, the combination with a plate-girder side, of metal post members, a metal filling member secured to each post member, a channel-bar forming a sash-stop and coöperating with said post members, an abutment for the upper sash, and a stop consisting of a strip having a groove for the window-curtain, the stops and abutment being secured to the filling member; substantially as described.

29. In a railway passenger-car, a side-post covering consisting of a vertically-flanged member having an outstanding flange in the plane of the window-sill; substantially as described.

In testimony whereof I hereunto affix my signature, in the presence of two witnesses, this 24th day of May, 1905.

GEORGE GIBBS.

Witnesses:
W. L. MURRAY,
H. S. JOHNSON.